United States Patent [19]

Rohen

[11] Patent Number: 5,186,629
[45] Date of Patent: Feb. 16, 1993

[54] VIRTUAL GRAPHICS DISPLAY CAPABLE OF PRESENTING ICONS AND WINDOWS TO THE BLIND COMPUTER USER AND METHOD

[75] Inventor: James E. Rohen, Huntersville, N.C.

[73] Assignee: International Business Machines Corporation, Armonk, N.Y.

[21] Appl. No.: 748,996

[22] Filed: Aug. 22, 1991

[51] Int. Cl.$^5$ .............................................. G09B 21/00
[52] U.S. Cl. ..................................... 434/114; 434/112; 434/116; 340/709; 340/710; 340/825.19; 364/419
[58] Field of Search ............... 434/112, 113, 114, 116; 340/707, 709, 710, 825.19; 364/419

[56] References Cited

U.S. PATENT DOCUMENTS

| 4,687,444 | 8/1987 | Garner | 434/114 |
| 4,694,494 | 9/1987 | Woolfson | 434/112 X |
| 4,881,900 | 11/1989 | Matsuoka et al. | 434/114 X |
| 4,985,692 | 1/1991 | Breiden et al. | 340/825.19 X |
| 5,068,645 | 11/1991 | Drumm | 340/710 |

FOREIGN PATENT DOCUMENTS

| 3901023 | 7/1990 | Fed. Rep. of Germany. |
| 2652933 | 4/1991 | France | 340/825.19 |
| 0207929 | 12/1982 | Japan | 340/710 |
| 881411 | 2/1988 | South Africa. |

Primary Examiner—Richard J. Apley
Assistant Examiner—Joe H. Cheng
Attorney, Agent, or Firm—Karl O. Hesse

[57] ABSTRACT

The disclosure teaches a computer mouse having tactile feedback to be used with audio computer output to provide a virtual graphic display to blind computer users. The mouse and audio feedback allow blind computer users to visualize computer graphic images and multiple screen windows in much the same way as these forms of computer output are visualized by persons with sight.

4 Claims, 9 Drawing Sheets

|  | SPREADSHEET PRIVATE BANKING ▽△ |
| --- | --- |

| C | D | E | F | G | H | I |
|---|---|---|---|---|---|---|
| 11 |   |   | ACCT | CLIENT NAME | S.S.NO. | *cursive* |
| 12 |   |   | *cursive* | *cursive* |   | *cursive* |
| 13 |   |   | *cursive* | *cursive* |   | *cursive* |
| 14 |   |   | *cursive* | *cursive* |   | *cursive* |
| 15 |   |   | *cursive* | *cursive* |   | *cursive* |
| 16 |   |   | *cursive* | *cursive* |   | 154.20 |
| 17 |   |   | *cursive* | *cursive* |   | *cursive* |
| 18 |   |   | *cursive* | *cursive* |   | *cursive* |
| 19 |   |   | *cursive* | *cursive* |   | *cursive* |
| 20 |   |   | *cursive* | *cursive* |   | *cursive* |
| 21 |   |   |   |   |   |   |
| 22 |   |   | 31 |   |   |   |
| 23 |   |   |   |   |   |   |
| 24 |   |   |   |   |   |   |

DOS    PRNT CNTL    MOUSE    DSKTP MGR

*Fig. 10.*

VIRTUAL GRAPHICS DISPLAY CAPABLE OF PRESENTING ICONS AND WINDOWS TO THE BLIND COMPUTER USER AND METHOD

BACKGROUND OF THE INVENTION

1. Field of the Invention

This invention relates generally to providing computer output to blind computer users and more particularly to providing means and method for allowing blind computer users to visualize computer graphic images and multiple screen windows in much the same way as these forms of computer output are visualized by persons with sight.

2. Background Prior Art

A number of electronically assisted or computerized reading systems have been proposed for use by the blind. Examples include German Patent Publication DE3901023 and U.S. Pat. No. 4,687,444.

The German publication teaches an optical scanner 11 mounted in a hand held device having a braille output matrix 5. The device is scanned across printed text which is "read" and "recognized" by a computer 3 and converted to braille for output to the user. No provision is made for handling non text graphics and icons.

The U.S. patent teaches a tape "reader" which converts text encoded onto a magnetic tape into braille output matrix 24. The tape is read into a buffer. The buffer is then read out to a braille matrix. The tape is commonly encoded in a braille code and can be amplified to drive the matrix actuators directly. Reading of the buffer is controlled by moving a mouse similar to those used with computers but there is only a horizontal distance output to control buffer addressing.

A device, called the Opticon, from Telesensory Company in Mountain View California, has the capability of translating the area surrounding the display cursor into a matrix of pins such that contrasting areas of the display will map to vibration of certain of the pins. The user places a finger of one hand on the pin matrix and the other hand holds and moves a mouse that causes the cursor to move about the display.

The original concept for the Opticon used a video camera that the user would scan across a paper document and then evolved thru camera lens changes to an ability to physically scan across a computer display. Further evolution was the substitution of a mouse driven cursor for the handheld camera. The pin matrix, however, remained a separate device that is touched by a finger of the other hand.

The computer workstation for sighted users has evolved from a simple character based display to displays of graphics, windows, and object oriented programming. This evolution continues with multimedia and mixed media screen presentations, voice annotations, and simulated prospective.

Likewise, the user interface to this graphical display has shifted from the keyboard towards the "mouse". The mouse allows the user to easily move from one area of the display to another, and by single and double clicking on it's button keys, to manipulate the objects upon which the mouse driven cursor lies.

An example of such an object manipulation is "drag and drop" whereby an object that represents a document, such as a musical composition, can be captured and dragged to an object which represents a printer and the document is printed; or dragged to a representation of a phonograph and the document is transposed to an audio rendition of the music.

A paper document is a fixation of information to a substrate. That is the text and/or graphics do not move once placed upon the paper. That is conditionally true also for a character based computer display. A document, though scrollable, is typically positional stable upon the screen. Thus it is reasonable to accept the learned ability of a blind user to be able to read text characters by feeling their impressions as simulated by a tactile readout device.

As described above with respect to a sighted user, windows appear, move, expand, and contract. Likewise menus pull-down, and scroll bars and radio buttons wait to be actuated. Icons represent objects to be manipulated. Objects, by dragging and dropping, interact with other objects and things happen—like printing, speech articulation, new object formation, etc.

The blind user requires a more sophisticated approach to interaction with this new technology. The compensatory enhancement of the sense of touch is not alone sufficient for spatial orientation when the information presented is free flowing, non-restrained, and particularly non-character representations.

SUMMARY OF THE INVENTION

In order to appreciate the environment that is created for a blind person by use of the apparatus and method of the invention, the reader of this application is requested to imagine being in a zoo among the freely roaming animals. The person can walk about touching and feeling the shapes of the animals who are also moving around. Upon request an animal will speak giving its name, how it differs from the other animals, and what it can do. This is the new era of computers within which a visually handicapped person must exist and thrive.

Accordingly it is an advantageous effect of this invention that an image of a computer display screen is created in the mind of a blind user by tactile feedback to the thumb and/or finger of the users hand that holds a mouse like input output device.

It is a further advantageous effect that a blind person can, using the invention, communicate in an object oriented graphic environment.

A still further effect is that a blind user can locate, identify, verify, change, and/or otherwise manipulate information and/or objects contained within a object oriented scheme as exemplified by a graphical user interface such as Presentation Manager residing on an operating system such as OS/2 or WINDOWS residing on DOS.

These and other advantages are obtained according to the invention by combining a computer, voice response and a mouse having touch feedback with the method of the invention. The combination of the invention operates most efficiently in an object oriented graphical environment.

The method of the invention determines that an object has been located by providing feedback to the mouse when a boundary is encountered. A contrast point on the display causes a feedback sensation in the hand moving the mouse. To allow for rapid and circuitous movement of the mouse it is necessary for the user feedback to be instantaneous. For this reason, feedback in the form of a mild electrical impulse, a physical vibration or other fast response manifestation is a preferred embodiment.

Clicking of a button will cause a voiced annotation of the encounter. If the object is a cell in a spread sheet, the response will be the numerical value, the text contained within that cell, or other information such as cell location/address. If the object is a note or chord on a musical composition, a representation of that sound will be heard. Similarly, if an icon object is encountered, the icon's property and use will be articulated or depending upon the program and the sequence of button depressions, it will be expanded so it can be more easily traced by the user with the mouse.

Clicking of a button on the mouse can cause any object encountered to be expanded so as to allow the user to explore the object by tracing. The mouse will continue to react so long as the cursor follows the path. Like walking along the road by feeling the difference in the surface contrast along the edge.

Figure 1:
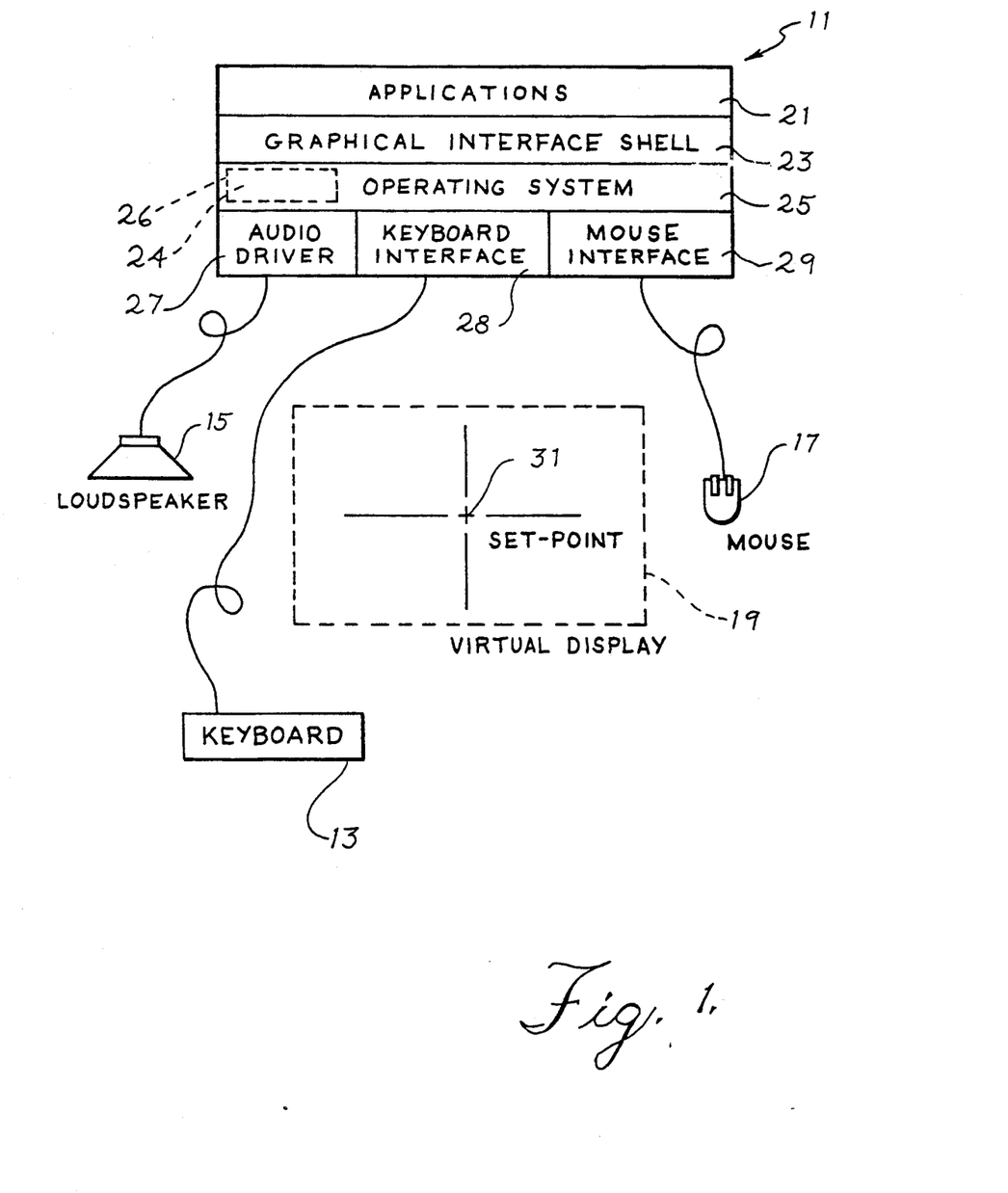
FIG. 1 shows the overall system in which the invention finds utility.
Figure 2:
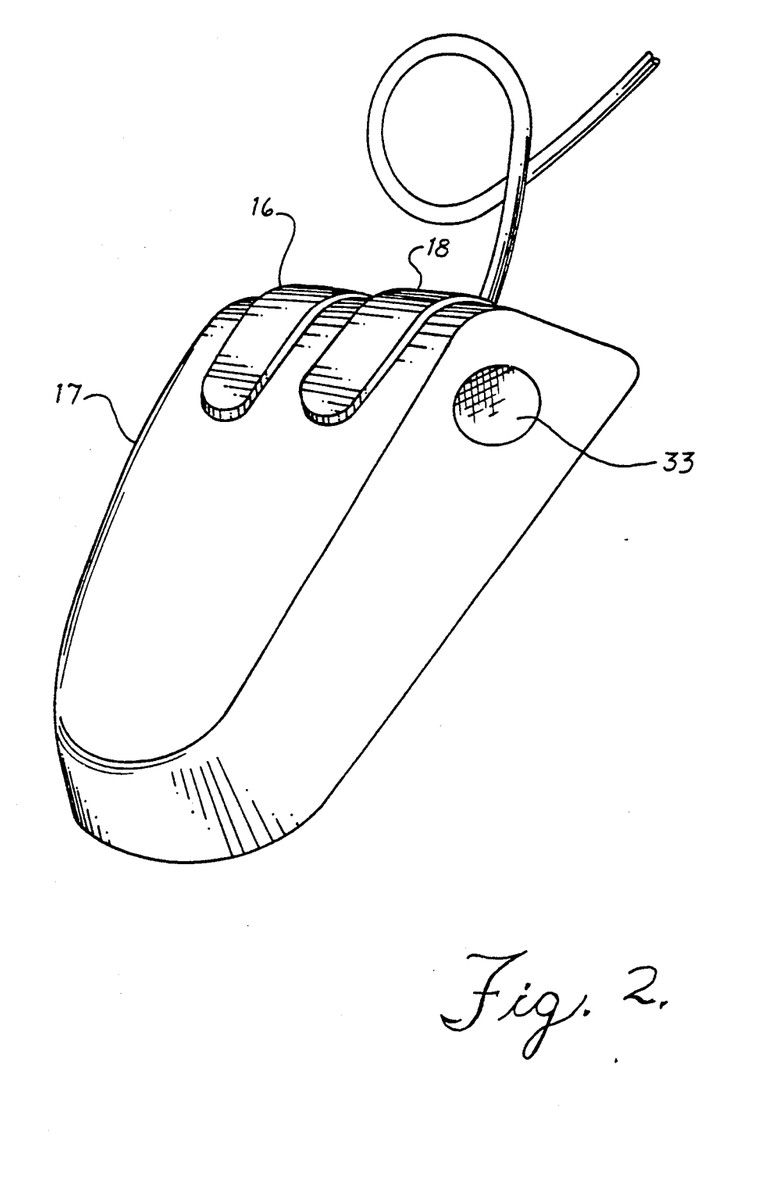
FIG. 2 shows an embodiment of the mouse incorporating the invention.

DETAILED DESCRIPTION OF PREFERRED EMBODIMENT:

FIG. 1 shows the overall system of the preferred embodiment which includes a computer 11 connected to the mouse 17 having tactile feedback, which is shown in more detail in FIG. 2. The system also has a keyboard 13 for alphanumeric input and a speaker 15 for beep, tone, and computer simulated speech output. Although not connected physically by wires to the computer, a virtual display 19 is shown in broken lines to portray the virtual display that is created in the mind of the user by means of the tactile and audio feedback that is provided by the computer.

Shown in the center of virtual display is a set-point 31. The computer has programmed means for re-positioning the mouse cursor to the preset set-point position 31 within the virtual display presented to the user by the tactile feedback in the mouse and audio feedback. Dead-center is a preferable position for the set-point as then the user has a shorter distance to traverse to get to any quadrant of the display. This is necessary when the user has lost spatial orientation and needs to re-discover the positions of objects on the virtual presentation. This is especially desirable when windows are re-sized or one window partially overlays another.

Also, the movement of addressing in the presentation buffer is not consistently proportional to mouse movement. This is due to changes in the coefficient of friction between the rolling mouse ball and the desktop surface, acceleration and damping effects from the hand control, and various similar factors. Though not desirable in normal mouse applications, it is tolerable since there is a constant visual feedback of the cursor location on the display screen. The blind user must have a reliable method for ad-hoc re-establishment of buffer addressing which is analogous to visual cursor location when the buffer is also connected to drive a visual display.

FIG. 1 also shows the programs that implement the method of the invention. Included are the application programs 21, which are preferably written as object oriented programs using a language such as Smalltalk or C++. The graphical interface shell 23 is a graphical user interface such as Presentation Manager used with the IBM OS/2 or WINDOWS used with Microsoft or IBM DOS. The input and output to and from the computer is effected by the I/O driver programs 27, 28, and 29. They control the speaker, the keyboard, and the mouse respectively. The mouse of course has both input and output functions implemented into its driver program.

Although not shown in FIG. 1, a visual display may also be connected to the computer to allow sighted persons to follow the activity of a blind user or to allow a user with sight to interact with the computer application using all the interfaces of sight, sound and feel.

When creating application programs incorporating the invention, a language within the family of Object Oriented Programming Systems (OOPS) is the preferred language. Two examples of such languages are Small-Talk and C++. These languages utilize objects and object-to-object communication and interaction. An object is an encapsulation of related pieces of program code (referred to as method) and data. Objects have attributes and exhibit behaviors. An object can be considered as a self-contained computer program that is operating on it's own data. Examples of objects are: windows, icons, menus, spreadsheets, documents, keyboards, and printers.

The application programs, operating system 25, device drivers, objects, etc. have sound annotation. Spreadsheets talk compositions play, documents read, and objects describe themselves. Sound annotation is added to the programs through the use of a device such as the IBM Audio Capture and Playback Adaptor. This is a plug in card for the IBM PS/2 computer. Also needed is the IBM Audio Visual Connection software program product. These items allow the user and programmer to capture, compress, and store voice and audio information in the computer memory or the DASD storage device.

Inheritance is a property that is exploited in OOPS languages. Inheritance allows the programmer to create an object by calling a similar object and defining only the differences (additions and subtractions) needed to identify the new object. A data-cell in a spreadsheet, for example, will be given voice articulation of the contents thru the use of the inheritance attribute.

Another unique characteristic in OOPS is polymorphism whereby objects respond with different behavior dependent upon their interaction with other objects. For example an object such as a pull-down menu can respond in a different mode to a blind user s mouse than it would to a normal mouse. The click from the former could cause the menu list to be read out whereas a click from the latter would cause it to visually scroll downward.

For those application programs which do not contain voice annotations, there are many text readout auxiliary programs available. These programs attempt to read words or will spell out the word by character. One example of this type of program is the Screen Reader by IBM.

These auxiliary programs when executed in a computer of the invention will cause tactile or touch feedback as objects are located. An object, such as the title block on a window, will be readable through text to voice conversions by the auxiliary program, but icons and graphical representations will not.

Referring now to FIG. 2, a perspective view of a mouse 17 incorporating a tactile feedback area 33 according to the invention is shown. The preferred form of feedback to the user is a very mild AC signal. This AC signal is adjustable in both voltage and current so as to give a mild tingling sensation at the fingertip holding the mouse. The sensation is similar to the touching of an electrical appliance having a small leakage current that is seeking a ground return through the persons body.

The prior art includes many physical mouse designs and mouse to computer interfaces. There is also a dependency of the graphical interface layer to establish the effect upon the for the purpose of this invention. I have chosen to utilize the IBM mouse and the IBM Presentation Manager graphical interface residing on the OS/2 operating system.

For this configuration, the mouse has two buttons labeled 16 and 18 as indicated in FIG. 2. The left button 16 is the principle usage control in the prior art IBM Presentation Manager graphical interface. A single left button click on an icon presents a menu list and a double click produces the default position on that list which is, typically, to produce the window which the icon represents.

A left button click-and-hold locks the icon to the cursor and allows a user with sight to reposition the icon elsewhere on a display.

Other uses for the single and double clicking reside within the window after it has been established as a transform from the icon. For example, there are two triangles at the upper right corner of the window. Clicking on the leftmost triangle causes the window to transform back to the icon while clicking on the rightmost triangle causes the window to expand to full screen in size.

The right button 18 on the mouse has little application when used by persons with sight, except to produce a task-list upon a single click. The task list is a listing of the icons (tasks) available for the use of the user.

In the IBM Presentation Manager graphical interface residing on the OS/2 operating system, there is the ability to reconfigure the operation and sequencing of the mouse buttons by changing the mouse configuration program. This is accomplished by calling the mouse window by clicking on the mouse icon.

I choose to use the left mouse button 16 as indicated above. I also choose to define and reconfigure the right mouse button 18 as follows:

| | |
|---|---|
| Single click. | Produce voice annotation. (if available) |
| Second (or double) click. | Stop voice annotation. |
| Double click and hold. | Go to set-point position. |
| Release. | Stay at set-point. |
| Single click and hold, then, | Expand area surrounding cursor. |
| Single click on left button. | |
| Release. | Return to normal screen presentation. |

The task list is available, as are all mouse button operations, as a multi-key actuation on the keyboard and of course, the user has the ability to re-configure the operation of the buttons as he desires as indicated above.

Figure 3:
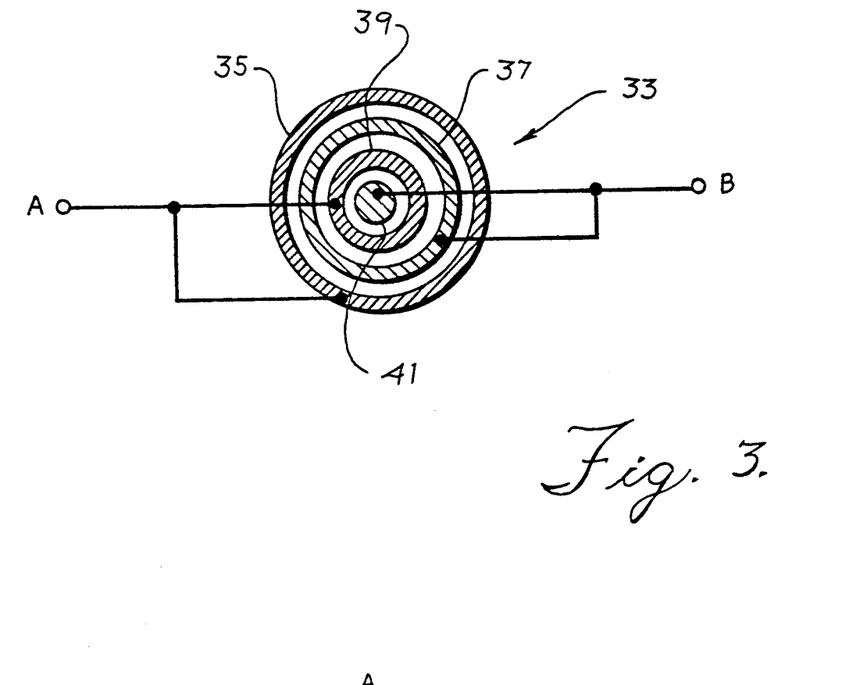
FIG. 3 shows an electrical tactile feedback element.

Now with reference to FIG. 3, a conductive area 33 is shown in which a single finger will be in contact with the different voltage potentials of the tactile electrical output of the mouse 17. The conductive area 33 comprises a group of concentric circles separated by insulating space. Circles 35 and 39 are electrically connected to terminal A and circle 37 and center circle 41 are connected to terminal B. A finger placed onto area 33 will be able to sense the current and voltage between terminals A and B as tactile feedback from the computer.

Figure 4:
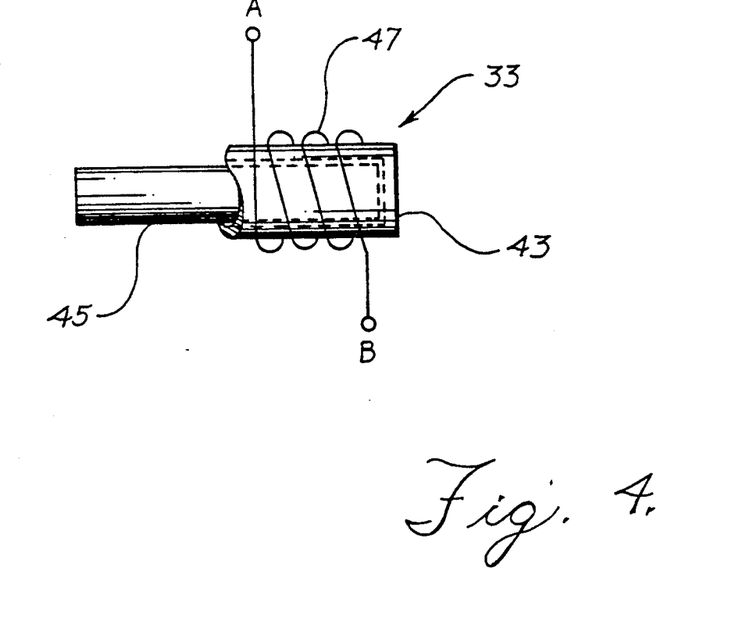
FIG. 4 shows a vibratory tactile feedback element.

FIG. 4 shows an alternate embodiment of the tactile feedback transducer as a vibrator or tone source which will be made to vary in intensity and/or frequency as the mouse 17 is moved to present different parts of the buffer information to the user. The transducer of FIG. 4 is a loudspeaker like device having a voice coil 47 and a magnet 45. The voice coil 47 is connected to a cone like member 43 that is thereby made to vibrate creating a tactile sensation as well as producing a separate audible sensation when operated at audio frequencies. The voice coil 47 has one end connected to terminal A and the other end connected to terminal B. The mechanism of FIG. 4 is similar to voice coil mechanisms which are used to drive the read/write head for movement across the rotating disks or diskettes in computer DASD storage devices.

Figure 5:
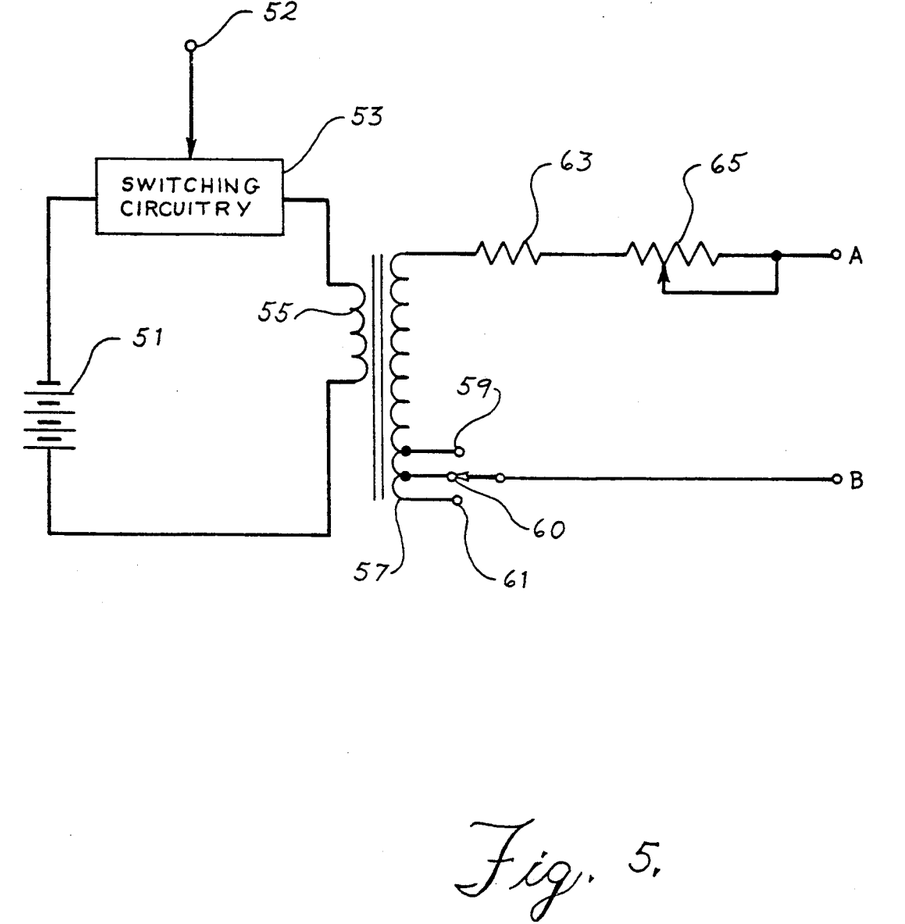
FIG. 5 shows a feedback driver circuit.

FIG. 5 shows the essential components required to furnish an AC tactile feedback signal from a low DC voltage available from the computer to which the mouse is attached, or from a battery if the mouse has a wireless connection to the computer. The DC voltage source 51 is applied to a switching circuit 53 which changes it to a sequence of pulsations under control of the feedback signal from the computer. The frequency of the pulsations are controlled by the feedback signal. The output of the switching circuit 53 is applied to the primary 55 of a transformer. The ratio of the turns in the primary winding 55 to the secondary winding 57 of the transformer determines the magnitude of the voltage available at the secondary. Taps 59, 60, and 61 on the secondary allow the magnitude of the voltage to be tailored to the user. Likewise the current limiting resistors 63 and 65 in series with the secondary voltage allow voltage is applied across terminals A and B to drive either the electrical transducer of FIG. 3 or the vibratory transducer of FIG. 4.

Figure 6:
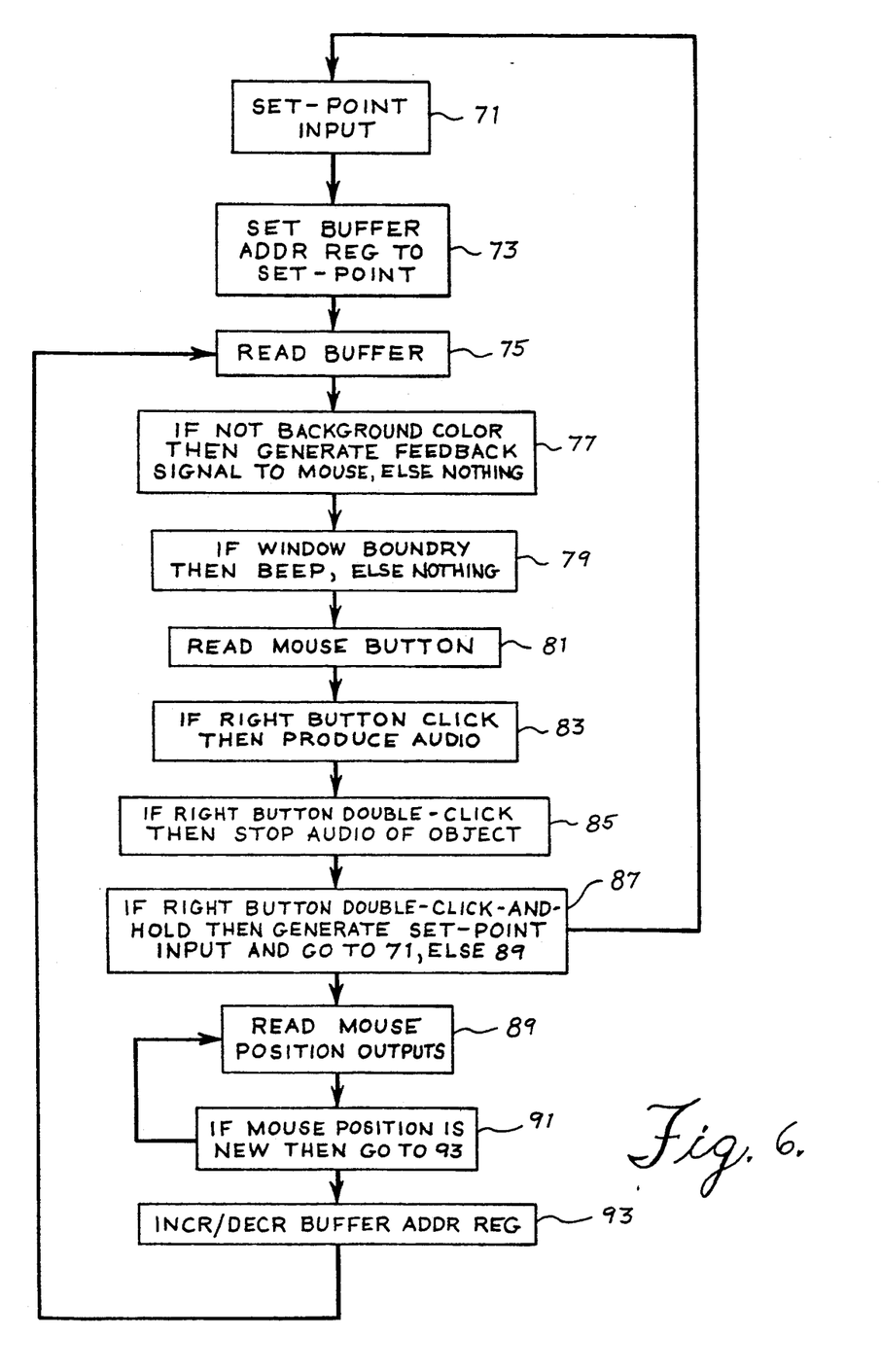
FIG. 6 shows a flow diagram of the method of operation of the invention.
Figure 7:
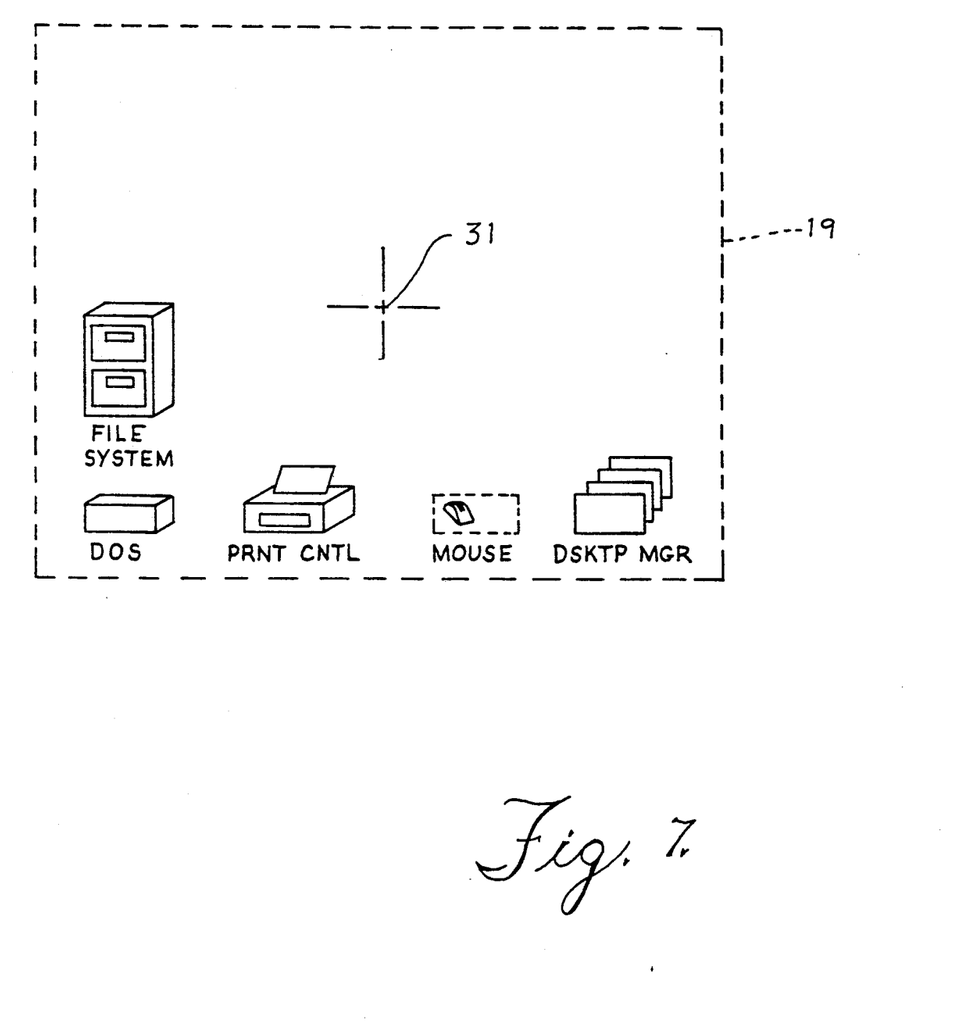
FIG. 7 is a representation of a display of a plurality of icons.

Referring now to FIG. 6 a flow diagram of the method of operation of the invention is set out.

The method is initiated at block 71 where a set-point input is received from either the graphical interface shell program or a button click as described hereinafter with respect to block 87. The set-point input causes the program of the invention to set the presentation buffer 26 address registers to the values that define the logical address of the set-point 31 at block 73. Thereafter the information at the addressed location 24 of the buffer 26 is read out at block 75 and used to obtain the presentation information pertinent to the presentation being presented at the corresponding x and y coordinates of the virtual display. The presentation information may be thought of as virtual picture elements that will be presented to the user by tactile feedback to the mouse.

If the program of the invention determines at block 77 that the information indicates that there is something other than background color, then a tactile feedback signal is generates. The signal defines a frequency indicative of the color of the information being presented. For example, the color red is a lower frequency and blue is a high frequency. This signal is then sent to the mouse 17 where it is applied to the feedback input 52 of the circuits shown in FIG. 5 to actuate the transducer of FIG. 3 or FIG. 4 at the defined frequency.

If the program of the invention determines at block 79 that the presentation information pertinent to the x and y coordinates indicates that a window boundary exists at these coordinates, then an audio beep is generated in response to the programmed determination.

At block 81 the buttons of the mouse 17 are read by the program of the invention. If the program finds one click of the right button at block 83 in FIG. 6, then the voice annotation of an object represented by the presentation at the coordinates of the virtual display is retrieved and presented to the user through speaker 15. Of course, there may be no object associated with the coordinates or there may be not voice annotation for an object if an object does exist.

The Voice annotation continues to be produced until the annotation either ends or until the user presses the right button twice to create a double click. The right double click at block 85 also stops the voice so that the user can continue exploring the presentation as soon as the object is recognized by the user.

At block 87, the program of the invention detects a double click and hold of the right button which is interpreted by the program as a request by the user to return to the set-point. This is done when the user loses orientation of material being presented and wishes to be reoriented by starting again from a known position on the virtual display. While the right button is being held, the user can also move the mouse to a convenient position thereby adjusting the position of the whole virtual display. When the button is released, the buffer is again read at block 75 to restart the presentation to the user.

A more normal step occurs at block 89 where the position outputs from the mouse 17 are read by the program of the invention. If the mouse has been moved while in contact with a surface, the position outputs will provide values to the program which are proportional to the change in x and y coordinates.

These values are then used by the program at block 93 to increment or to decrement the logical address registers which access the buffer 26. In this way, the buffer can be read at a new logical address to obtain presentation information at a new location in the virtual display.

In addition to the method of the invention which is programmed to control the computer, the user operates the computer under the programmed control of the invention by initiating user chosen moves of the mouse and clicks of the left and right buttons to interact with the objects being presented.

In order to better understand the invention, it is desirable to describe a synopsis of the blind user interacting with the virtual desktop display with reference to the FIGS. 7 through 10. Using an operating system such as OS/2, the user turns on the computer and, after a time, the OS/2 Presentation Manager Graphical Screen is made available upon the virtual display by loading the buffer 26 with the objects shown in FIG. 7.

By moving the mouse the user encounters and feels icons in the presentation. The user determines where these icons are by moving and exploring the virtual display area using the tactile feedback from the mouse. A click of the button as described with respect to block 83 in FIG. 6 articulates the name and properties of the icon. He can drag the icon and position it to preferred positions on the desktop for future use.

Having selected an icon, a double click of the left button produces a window that can be explored. Edges of the window are located by moving and feeling with the mouse. Window edges are also uniquely identified by an audio beep.

When the cursor encounters the edge of a window it changes from a single to a double ended arrow. This visually indicates to a user with sight that the window can be resized by click-holding the left mouse button and dragging the window edge. As described above, this function has been implemented in the invention as an audio beep for the blind user. In OOPS it is done by the previously mentioned inheritance addition to the cursor object. For base level code it will require addition of an additional sub-routine to the cursor control code.

Figure 8:
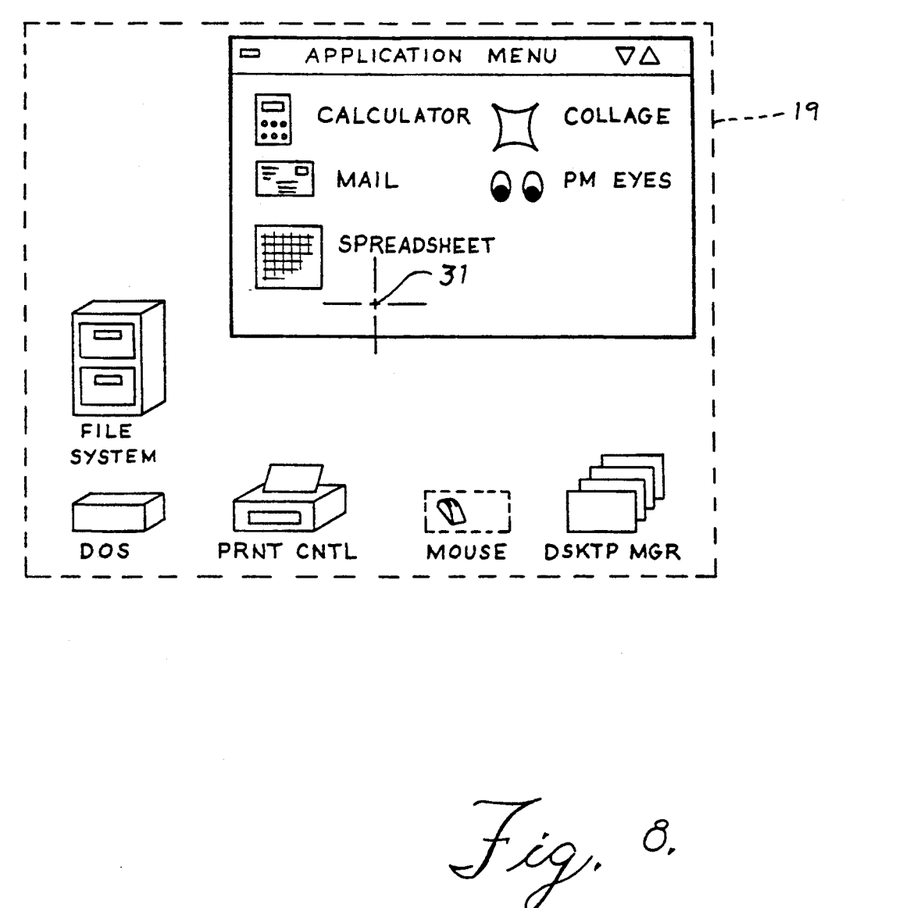
FIG. 8 is a representation of a display of the screen of FIG. 7 where one of the icons has been transformed into a menu window.

Assume that the icon selected was for an application menu window as shown in FIG. 8. This selected window contains a listing of applications available and their respective icons. The user enters and explores this window with the mouse. The user determines the window edges by feel and the audio beeps, and identifies the icons and associated text by feeling, clicking, and listening to the vocal responses.

Figure 9:
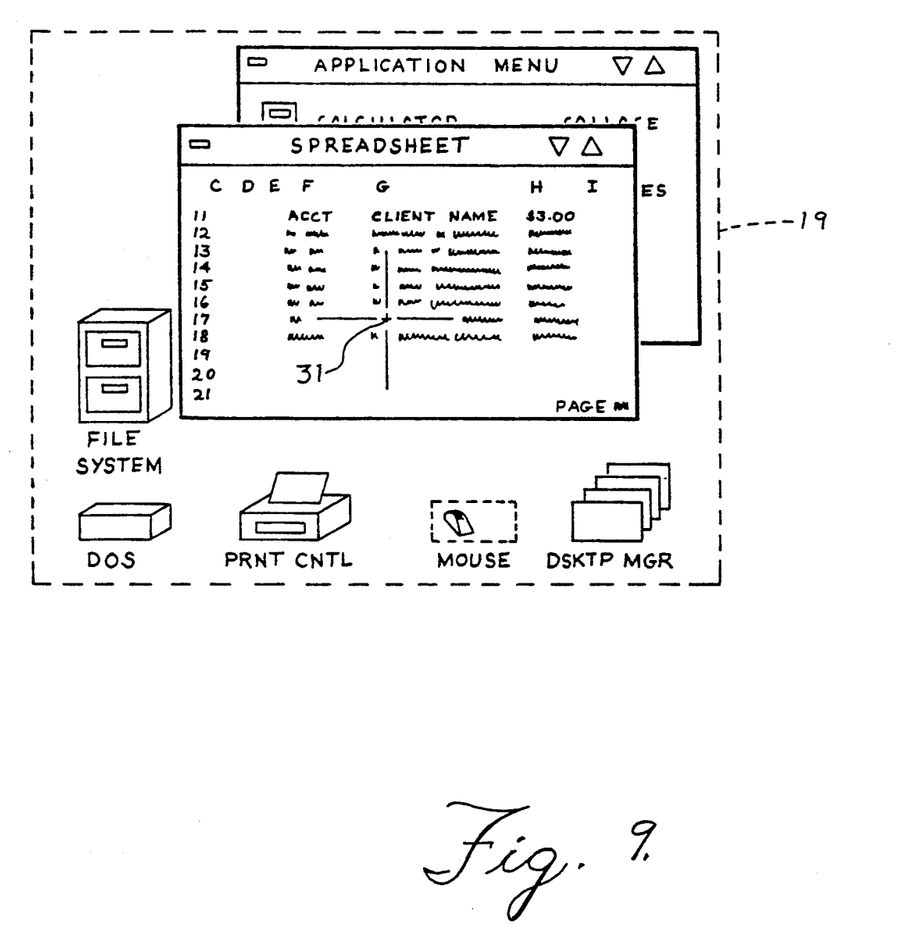
FIG. 9 is a representation of a display of the screen of FIG. 8 where one of the icons in the menu window has been transformed into an application window.
Figure 10:
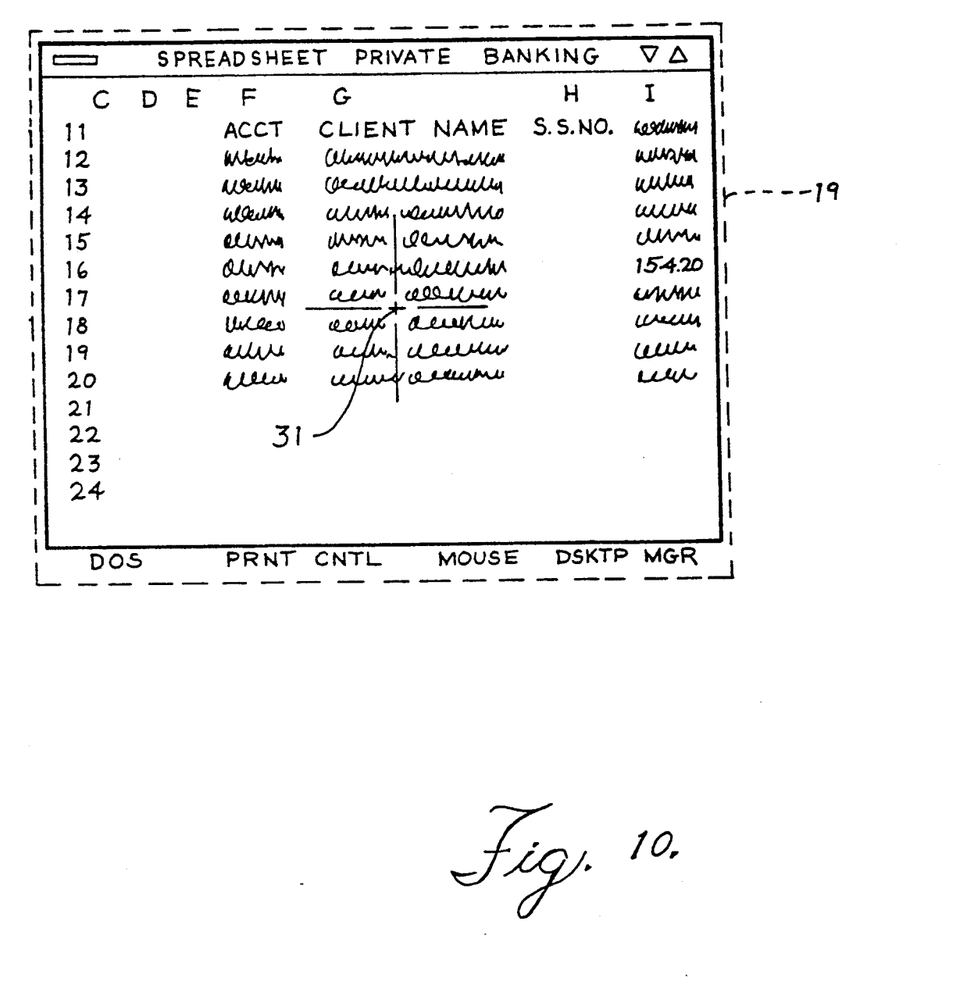
FIG. 10 is the application window of FIG. 9 after expansion to full screen display showing the operation of modifying a spread-sheet.

Locating and selecting one of the icons on the menu window of FIG. 8 produces another window which, perhaps, overlaps the menu window as shown in FIG. 9. Assume that this latest acquired window is a spreadsheet.

The question now is if this is the desired spreadsheet, it can be identified by clicking at it s title whereby the title is read aloud as described with respect to block 83 of FIG. 6. Any cell within any row or column can be located by feeling the boundary crossings and the text within the cells. A click articulates the contents of the cell. A standard typewriter style keyboard allows entry or modification of data within the cell which can then be clicked upon for voiced verification.

The user experience will be as if the user had a large spread sheet upon his desktop. All of the printing is raised and when the mouse encounters this raised printing the users fingers feel a mild electrical tingle or mechanical vibration.

When the user is at an area of perceived interest, for example a row/column intercept data point, a request by a mouse click described with respect to block 83 of FIG. 6 will cause a voiced readout of what is contained at that point. For example: "one-five-four-point-two-zero", "customer-account-number", "page-one-seven".

Over time, familiarity and a learning curve will cause the user to be comfortable with determining various spread sheets by their layouts and the voice indication of the title or page number on the paper.

The significance is that the user obtains the voiced information only upon request of a mouse click. The user is free to rapidly scroll across the spreadsheet in quest of the desired column or row. Location of desired information is recollected by reference to adjacent column/row information. Text is articulated by character, word, line, or paragraph and initiated under control of the user.

Closing the spreadsheet window, by locating and clicking on the close icon, re-establishes the application icon which can be dragged to a printer icon, stored in a file, or sent to another computer terminal on the network.

Although the invention has been described in the form of the preferred embodiment for use by a blind user, it will be recognized that the advantages of the invention are also useful to people who can see. Accordingly a visual display apparatus may be added to the computer for user by sighted persons when working alone or together with a blind user. Likewise many other changes in form and detail will suggest themselves to those skilled in the art of interactive computer terminal design without departing from the spirit and scope of the invention which is measured by the following claims.

What I claim is:

1. A virtual graphics display system for the blind computer user comprising:

a computer having a buffer for storing information to be presented to a user;

a mouse connected to said computer for providing buffer addressing input signals to said computer, and for receiving tactile feedback signals from said computer and presenting said tactile feedback signals to said user;

an audio output device for presenting audio information to said user;

first programmed means operating in said computer, said first programmed means responsive to a set-point input signal for addressing a set point in said buffer;

second programmed means operating in said computer, said second programmed means responsive to said buffer addressing input signals from said mouse to retrieve presentation data representing virtual picture elements on a virtual display;

third programmed means operating in said computer, said third programmed means responsive to said picture elements for generating a first tactile feedback signal to said mouse when said picture elements represented a nonbackground information;

fourth programmed means operating in said computer, said fourth programmed means responsive to said picture elements for generating a first audio feedback signal to said audio output device when said picture elements represent nonbackground information that is also a window edge.

2. The method of presenting graphical information in the form of screen windows in the virtual display of a computer to a blind computer user comprising the steps of:

logically addressing presentation information in a memory by a hand held tactile feedback input device;

retrieving graphical information related to a point of said presentation information in the virtual display of the computer;

vibrating a transducer on said hand held tactile feedback input device if said graphical information indicates that a non background color is being presented at said point; and changing the logical address into said presentation information by means of said hand held tactile feedback input device before repeating the above steps.

3. The method of claim 2 wherein the frequency of vibration of said transducer is related to the color of said non background color.

4. The method of claim 2 further comprising the step of changing the logical address into said presentation information to a predetermined set-point.

* * * * *